June 29, 1965

J. LONG 3,192,482

CIRCUIT FOR GENERATING AN INVERSE SIGNAL
UTILIZING A MULTIPLIER CIRCUIT

Filed Dec. 10, 1962

INVENTOR.
JAMES LONG
BY
HIS ATTORNEY

June 29, 1965 J. LONG 3,192,482
CIRCUIT FOR GENERATING AN INVERSE SIGNAL
UTILIZING A MULTIPLIER CIRCUIT
Filed Dec. 10, 1962 3 Sheets-Sheet 2
FIG. 4
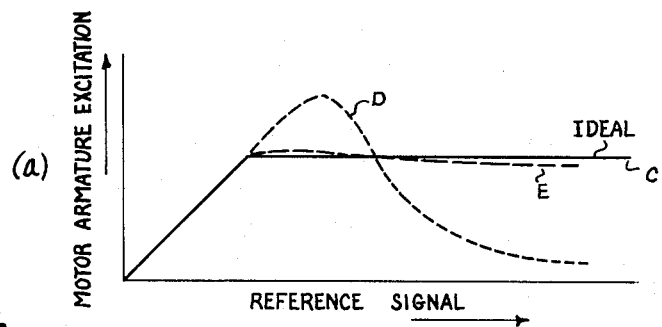
(a)
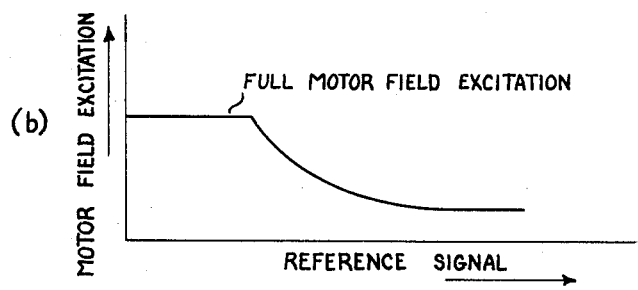
(b)
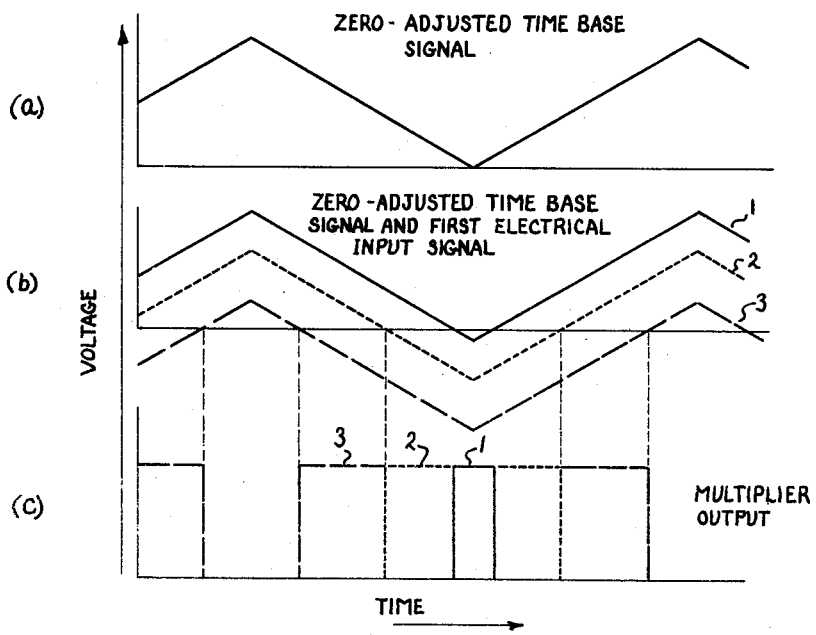
FIG. 6
INVENTOR.
JAMES LONG
BY
HIS ATTORNEY

INVENTOR.
JAMES LONG
BY
HIS ATTORNEY

United States Patent Office 3,192,482
Patented June 29, 1965

3,192,482
CIRCUIT FOR GENERATING AN INVERSE SIGNAL UTILIZING A MULTIPLIER CIRCUIT
James Long, Erie, Pa., assignor to General Electric Company, a corporation of New York
Filed Dec. 10, 1962, Ser. No. 243,315
7 Claims. (Cl. 328—160)

This invention relates to control systems and more particularly to such systems requiring only electrical control signals and incorporating static circuit means for developing a control signal inversely related to a selected reference signal; and to novel circuit means for developing such control signal.

While this invention has a wide range of applications, such as for example various direct current motor control systems, inertial compensation means involved with reel build-up, constant cutting speed machining operations, and various other control systems requiring control of a parameter in a manner hyperbolically related to a selected reference signal, it is particularly suitable for use in dual-range motor control systems and will be particularly described in that connection.

In dual-range motor control systems, the speed of the motor is controlled in accordance with excitation provided by the armature and field windings thereof. In such systems a reference signal is provided indicative of a desired operating speed. For a reference signal below a predetermined value, the desired speed is obtained by controlling the excitation of the motor armature, while for a reference signal above the predetermined value, the desired speed is obtained by controlling the excitation of the motor field. To obtain accurate speed control by adjusting a reference quantity indicative of a desired speed, the reference quantity-field excitation characteristic should approach, as nearly as possible, the actual speed-field excitation requirements of the motor.

Attempts have been made in the prior art to employ a potentiometer in the motor field control circuit to achieve an excitation-speed characteristic approximating the actual motor speed-field excitation requirements. Such systems, however, require a mechanical input to the potentiometer which is a serious limitation for many applications. For example, it is extremely desirable that no such mechanical inputs be required and that only electrical signals be required to provide the desired operation. This is necessary in order to provide a motor control system which is adapted to the incorporation therein of additional control circuit means between the speed reference signal and the control system. For example, it is often highly desirable to provide the system with timing circuits, acceleration and deceleration control circuits, and the like, all of which produce only electrical control signals and so are not easily compatible with a system requiring a mechanical input.

One dual-range motor control system requiring only electrical control signals is shown and claimed in my United States Patent No. 3,054,937. In that system there is provided a passive circuit means employing nonlinear resistance elements to control the excitation of the motor field in a manner closely approximating the excitation-speed requirements of the motor.

Although the system of my above-referenced patent is entirely satisfactory for a wide variety of applications and possesses the versatility afforded by the absence of mechanical inputs, the ever increasing need to provide more accurate motor speed control requires that the excitation of the motor field be controlled, not only by a means requiring no moving parts, but also by a means which more accurately provides the control signal for controlling the motor field excitation in a manner approaching the excitation-speed requirements of the motor.

It is an object of this invention, therfeore, to provide an improved dual-range motor control system which overcomes one or more of the prior art limitations and is more accurate.

It is another object of this invention to provide a static circuit means capable of accurately and reliably producing a control signal more nearly approaching the desired excitation-speed requirements of the motor than in any system known heretofore.

It is another object of this invention to provide a simplified static multiplier circuit.

Briefly stated, in accordance with one aspect, this invention provides a dual-range motor control system incorporating a static circuit means for developing a control signal operative to control the motor field excitation in a manner essentially hyperbolically related to a reference signal indicative of a desired operating speed. The static circuit means comprises an operational amplifier, having a feed-back loop, including therein a static multiplier circuit the output of which is proportional to the product of the amplifier output and the reference signal so that the amplifier output is hyperbolically related to the selected signal. The system may also include means for modifying the output of the static circuit means to compensate for armature reaction and motor field saturation so that a control signal is provided which very nearly approaches the actual excitation speed requirements of the motor.

The static circuit means for producing the control signal hyperbolically related to a selected reference signal is adapted to a range of applications in addition to the motor control system disclosed in detail herein.

The novel features believed characteristic of the invention are set forth with particularity in the appended claims. The invention itself, however, both as to its organization and method of operation, together with further objects and advantages thereof, may best be understood by reference to the following description taken in connection with the accompanying drawings wherein like reference numerals identify the same or similar components and in which:

Figure 1:
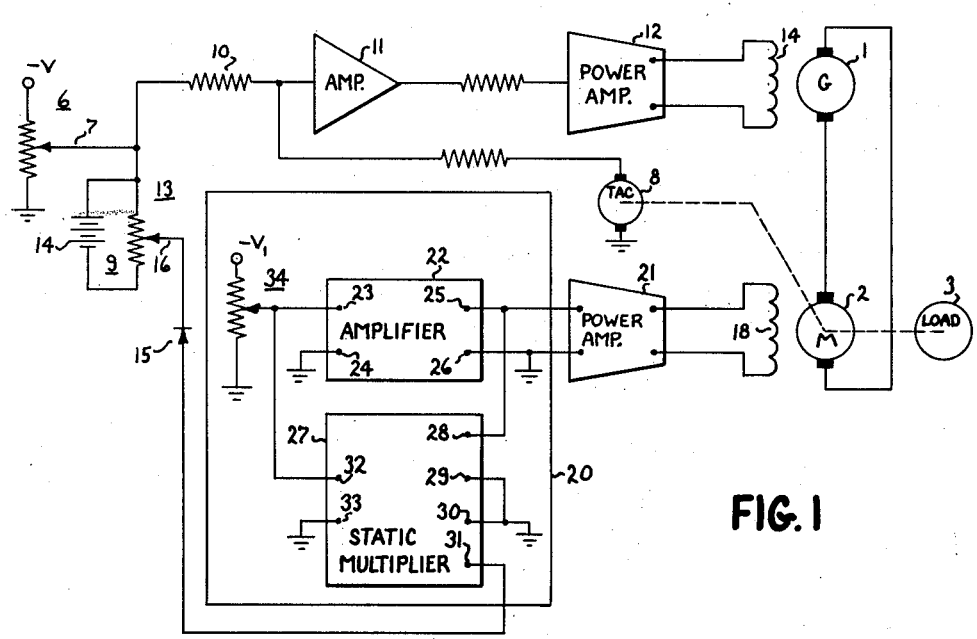
FIG. 1 is a block diagram of a dual-range motor control system in accordance with one aspect of this invention.
Figure 7:
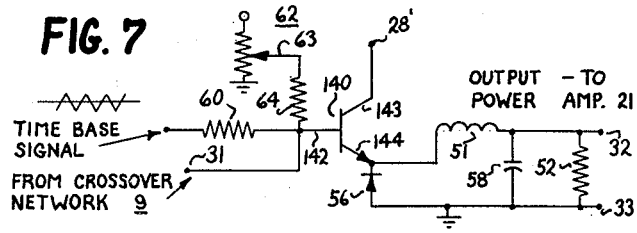
Figure 5:
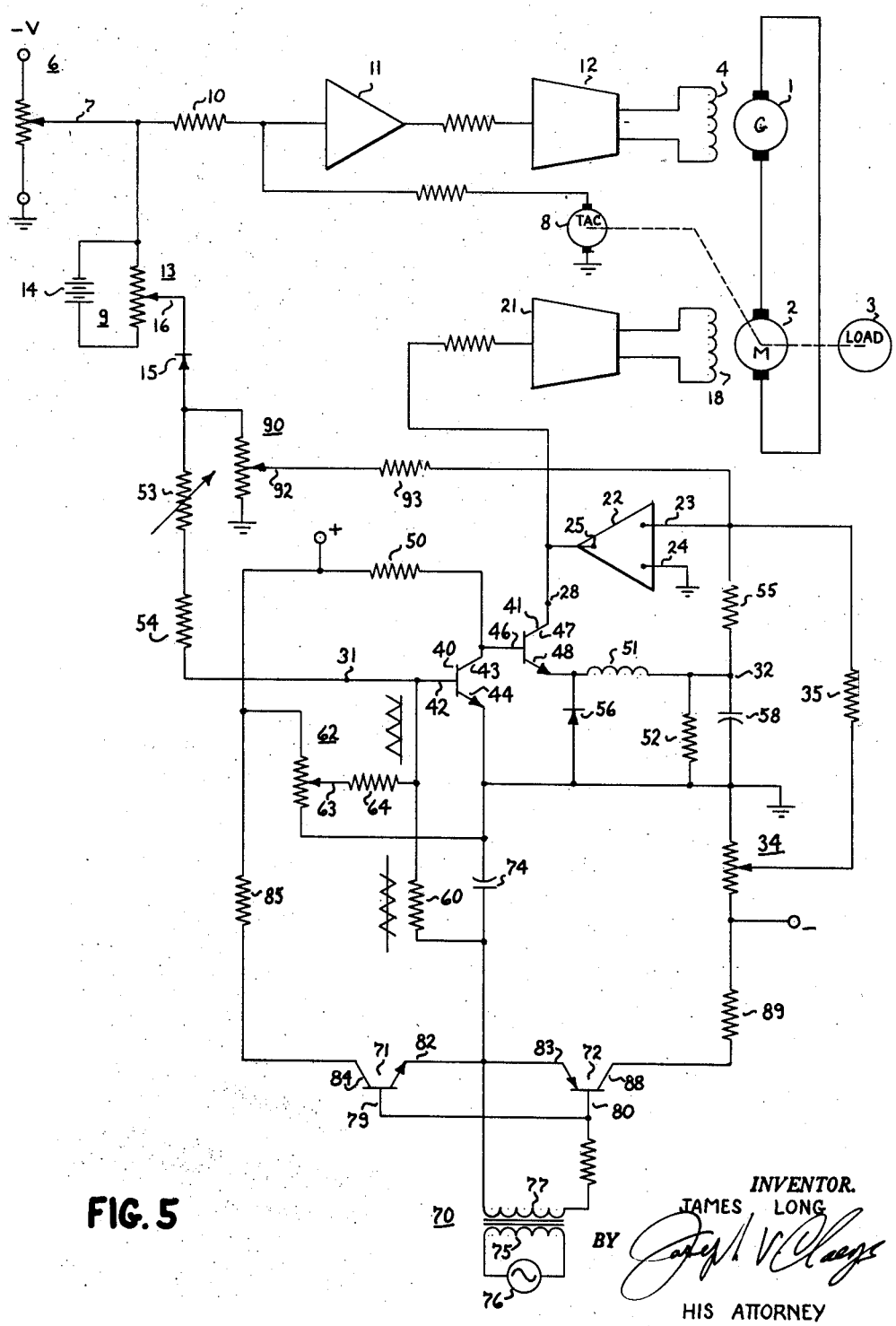

FIG. 4 graphically shows the dual-range operating characteristics of the motor control system of this invention;

FIG. 5 is a more detailed schematic diagram of the motor control system of FIG. 1 showing the static circuit means for controlling the motor field excitation wherein the multiplier circuit, operational amplifier and modulating time base signal source are shown in detail;

FIG. 6 is a graphical illustration of the operation of the multiplier circuit for a modulating time base signal of triangular wave shape; and, FIG. 7 is a circuit diagram of a modification of the static multiplier circuit illustrated in the system of FIG. 5.

In FIG. 1 there is shown a block diagram of a dual-range motor control system, in accordance with this invention, wherein the speed of a direct current motor is controlled in accordance with the excitation provided by the armature and field windings thereof in a manner which provides essentially a linear relationship between motor speed and a reference signal indicative of a desired motor operating speed.

As shown, the system comprises an amplifier, such as generator 1, which supplies electrical energy to the armature of a direct current motor 2 which drives a load, shown schematically at 3. The terminal voltage of the generator, and hence the excitation supplied to the motor armature, is controlled by the excitation of generator field winding 4 which is controlled in response to a reference signal indicative of a desired motor operating speed.

The speed reference signal, indicative of the desired motor operating speed, is provided by potentiometer 6 which is connected to a source of direct current voltage (not shown). The setting of the movable tap 7 of potentiometer 6 determines the magnitude of the speed reference signal and, hence, the desired operating speed of motor 2.

A tachometer 8, which may be connected to the shaft of motor 2, or driven thereby in any other known manner such as by a pulley or gear drive, is driven at a speed proportional to motor speed and produces a signal proportional thereto. The tachometer provides a feed-back signal which is utilized to regulate the speed of the motor to the desired value determined by the setting of potentiometer 6.

Alternatively, the feed-back signal may be derived from the generator output voltage to provide for speed regulation. For such regulation, however, the speed reference signal from potentiometer 6 is clamped at a predetermined value, normally, that value which will cause generator 1 to apply full rated voltage to the armature of motor 2.

The speed reference signal appearing at the movable tap 7 of potentiometer 6 is applied to a crossover network 9 and also, through resistance 10, operational amplifier 11 and power amplifier 12, which may be a magnetic amplifier for example, to provide excitation for generator field winding 4.

The term "operational amplifier" is used throughout the specification and the appended claims in its accepted sense to designate a high gain, linear direct current amplifier adapted to produce an output whose polarity is opposite to that of its input and which is further adapted to have a zero output when its input is zero; "high gain" for such an amplifier normally meaning a gain of about $10^3$ or greater. Amplifier 11, therefore, is of the type having the above characteristics and being known in the art as "operational amplifiers."

The crossover network 9 is shown in a simplified form and comprises a potentiometer 13 connected across a source of voltage, shown schematically as a battery 14. A rectifying device 15 is connected in series with the movable tap 16 of potentiometer 13 and is reverse biased until the speed reference signal from potentiometer 6 exceeds a value determined by the setting of movable tap 16. This value is normally the value which will cause full rated voltage to be applied to the armature of motor 2.

Figure 2:
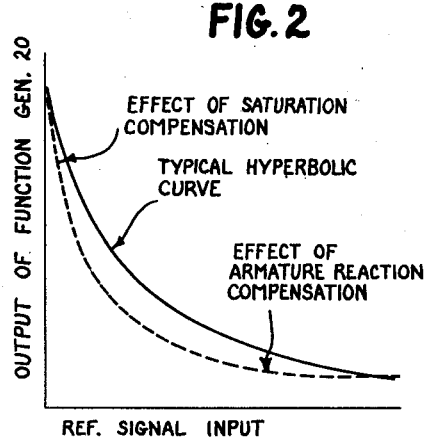
FIG. 2 shows typical inverse function curves produced by the static circuit means of this invention.

The motor 2 has a separately excited field 18 controlled in response to the speed reference signal through crossover network 9, static inverse function generator 20 and power amplifier 21, which again may be a magnetic amplifier. More specifically, motor field excitation 15 decreased in a manner very closely approaching the actual field excitation-speed requirements of the motor. Typical inverse function curves produced by function generator 20 are shown in FIG. 2.

Static inverse function generator 20 includes an operational amplifier 22 having input terminals 23 and 24 and output terminals 25 and 26, and a multipler circuit 27, adapted to receive input signals at its input terminals, 28–29 and 30–31 respectively, and produce an output at terminals 32–33 which is proportional to their product. The output at terminals 25–26 of amplifier 22 is coupled to input terminals 28–29 of the multiplier and constitutes one input signal thereto. The output of the multiplier at terminals 32–33 is coupled to the amplifier input terminals 23–24 so that multiplier circuit 27 is connected in the feedback loop of amplifier 22. The speed reference signal from potentiometer 6 is applied through crossover network 9 to input terminals 30–31 as the second input of multiplier 27. An input to amplifier 22 is supplied from a source of direct current shown as a potentiometer 34. The maximum output of amplifier 22 is provided when the speed reference signal is at its smallest value. Normally, maximum output from amplifier 22 provides for full rated motor field excitation.

The output of function generator 20 is inversely related to the input signal from potentiometer 6 and is applied to the input of power amplifier 21 which is thereby operative to control the excitation of motor field winding 18 in a manner very closely approaching the actual excitation-speed characteristic of the motor. Further, the output of the inverse function generator may be suitably modified to compensate for armature reaction and motor field saturation, in a manner to be described in detail hereinafter, so that extremely accurate and reliable motor speed control may be achieved. For example, the static inverse function generator 20 produces an output which is almost exactly inversely related to the speed reference signal, which output may pe readily modified to provide the desired motor field excitation characteristic.

As evident from the block diagram of FIG. 1 additional control functions such as timing, acceleration and deceleration, and the like, may be provided for the system by inserting the circuit means providing such function between the speed reference signal from potentiometer 6 and the rest of the system, as for example between potentiometer 6 and crossover network 9, so that the motor control system of this invention is extremely versatile.

Figure 3:
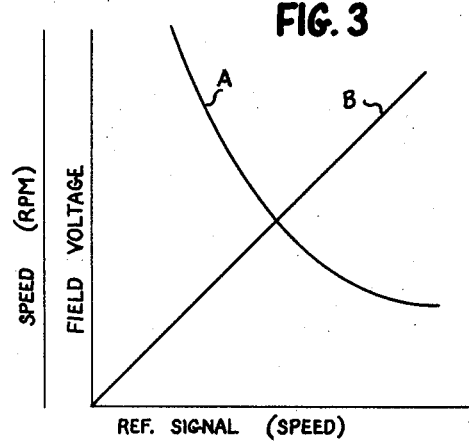
FIG. 3 is a graphical illustration of a typical field excitation-speed characteristic of a direct current motor and the relationship of a speed reference signal to motor speed.

The significance of the foregoing described motor field excitation characteristic is well known and may be shown more clearly by reference to FIG. 3. Curve A illustrates a typical field voltage-speed characteristic of a direct current motor. As the motor field voltage decreases, the motor speed increases at an ever increasing rate. At low values of motor field excitation very little change in field voltage is required to produce a large change in speed. Curve B illustrates a plot, on the same axis, of a speed reference signal with respect to motor speed and is illustrative of the desired linearity between the speed reference signal and motor speed.

The more nearly the motor field excitation is controlled in accordance with the relationship shown in curve A, the more nearly the ideal linear relationship of curve B is achieved when actual armature supply requirements are considered. For example, since the motor speed is being regulated by the feed-back signal from tachometer 8, the output of generator 1 will tend to change, thereby changing the motor armature excitation to achieve a change in speed and maintain the linearity shown in curve B of FIG. 3. This would require increased size and capacity for both generator 1 and motor 2 if the motor field excitation differs from the motor requirements. Therefore, when the motor field excitation is controlled in a manner corresponding to the actual excitation-speed requirements of the motor, the generator output, and hence, the motor armature excitation, may remain essentially constant.

This may be illustrated more clearly by reference to FIG. 4a wherein curve C illustrates a constant motor armature excitation at rated value which is the ideal condition and would be achieved for a perfect correspondence between motor field excitation and the actual motor requirements to provide the linear relationship shown in curve B of FIG. 3. Curve D of FIG. 4a illustrates the change in armature excitation (and hence in generator terminal voltage) to achieve the linear relationship when the motor field excitation deviates from the actual requirements, while curve E illustrates the very slight change in armature excitation when the motor field is excited in accordance with this invention, which excitation may be made to so nearly correspond to the actual motor requirements.

A comparison of curve A of FIG. 3 with the typical inverse function curves which may be produced by function generator 20 further illustrates the extreme accuracy with which the motor field excitation may be controlled in almost the ideal manner.

In the operation of the system shown in FIG. 1, adjustment of tap 7 of potentiometer 6 from zero voltage causes an increase in the excitation of generator field winding 4 resulting in an increase in generator terminal voltage and an increase in the voltage applied to the armature of motor 2 to increase motor speed. The speed of motor 2 will increase in this manner until the setting of potentiometer tap 7 is such that full rated armature voltage is applied to motor 2.

When tap 7 is adjusted so that the speed reference signal has a value exceeding that necessary to cause rated voltage to be applied to the motor armature, rectifier device 15 becomes forward biased allowing the speed reference signal to be applied to the input of static inverse function generator 20 to control the motor field excitation in the manner illustrated in FIG. 5b.

As shown, the speed reference signal is applied as one of the input signals of multiplier circuit 27; the other input of multiplier 27 being the output of operational amplifier 22. The output of the multiplier, therefore, is proportional to the product of the amplifier output signal and the speed reference signal. This output from the multiplier is then applied to the input of the amplifier 22 as a variable negative feed-back signal so that the output of the operational amplifier, with the feed-back, and hence the output of the inverse function generator 20, is hyperbolically related to the speed reference signal.

The above conclusion may best be explained by reference to the well-known equation expressing the gain of an amplifier with negative feed-back $$(1) \qquad G = \frac{A}{1+AB}$$

where A is the amplification without feed-back and B is the fraction of the amplifier output voltage negatively fed-back to the amplifier input.

If the product AB, the gain around the feed-back loop, is made such greater than unity, which is provided in the present invention by making A very large, the 1 in the denominator may be disregarded and the expression of Equation 1 reduces to $$(2) \qquad G = \frac{1}{B}$$

Where, as in the present invention, B is a variable, the above equation describes the output as hyperbolically related to B. The hyperbola so produced may readily be made essentially the same as the field excitation-speed characteristic of the motor.

In FIG. 5 there is shown a circuit diagram, partly in block form, of a dual-range motor control system of FIG. 1 wherein the static inverse function generator of this invention, including the amplifier 22 and multiplier 27, and its interconnection into the motor control system is shown in detail. Also the means for modifying the output of function generator 20 to provide an output which is compensated for motor field saturation and armature reaction respectively are shown in detail.

As in FIG. 1, motor armature excitation up to full rated voltage is controlled by the speed reference signal from potentiometer 6 through amplifier 11, and power amplifier 12 which are operative to control the excitation of generator field 4. For a reference signal above the value necessary to provide full rated voltage to the armature of motor 2, rectifier 15 becomes conductive allowing the reference signal to be applied to the input of the inverse function generator 20.

In further accord with this invention I provide a static inverse function generator 20 comprising the operational amplifier 22 and the multiplier 27 which is suitably connected in the amplifier feed-back loop to provide that the output of the operational amplifier is inversely related to the input signal applied to function generator 20. The input signal to amplifier 22 is supplied from potentiometer 34 through resistance 35.

Multiplier circuit 27 comprises first and second switch means, such as transistors 40 and 41, each having an effective open and closed operating condition. Transistor 40 has a base electrode 42, a collector 43 and an emitter electrode 44 while transistor 41 has similar base, emitter and collector electrodes 46, 47 and 48 respectively.

Transistors 40 and 41 are arranged to be in opposite operating conditions with the operating condition of transistor 40 determining the operating condition of transistor 41. Normally transistor 40 is in its closed, or conducting, condition with transistor 41 in its open, or nonconducting, condition.

To this end, collector electrode 43 is connected through a suitable series resistance 50 to a point of positive potential and emitter electrode 44 is connected to a point of reference potential, such as ground, so as to render transistor 40 in a conducting condition.

Collector electrode 43 of transistor 40 is connected to base electrode 46 of transistor 41 so that the voltage appearing at collector electrode 43 is the base voltage of transistor 41. Emitter electrode 48 of transistor 41 is connected through an inductance 51 and resistance 53 to the point of reference potential and, through resistance 55, to the input of amplifier 22. When transistor 40 is conducting the collector voltage thereof is operative to render transistor 41 nonconducting and when transistor 40 is nonconducting its collector voltage is operative to render transistor 41 conducting. Thus, the operating condition of transistor 41, which is opposite that of transistor 40, is determined by the operating condition of transistor 40.

The first electrical signal to be multiplied, for example the speed reference signal from potentiometer 6, is applied to the first switch means and the second electrical signal to be multiplied, for example the output of operational amplifier 22, is applied to the second switch means. The first signal to be multiplied is then suitably modulated with a time base signal, as for example a signal of triangular or sawtooth wave shape, so that the operating condition of the first switch means is changed for a time during the modulation cycle which is linearly proportional to the magnitude of the first electrical signal.

To this end, the speed reference signal, having a polarity tending to render transistor 40 nonconducting, is applied through series resistances 53 and 54, one of which is variable, to the base electrode 42 of transistor 40. The second electrical signal to be multiplied, for example the output of amplifier 22, is applied to collector electrode 47 of transistor 41. The output of the multiplier circuit, therefore, appears between emitter electrode 48 of transistor 41 and ground and is applied through resistance 55, and an averaging circuit, including rectifying device 56, inductance 51, resistance 52 and capacitance 58, to the input terminals 23–24 of amplifier 22. Since the voltage at emitter 48 is a square wave, the averaging circuit is employed to smooth the direct current output voltage of the multiplier.

With transistor 40 in a conducting condition, and, therefore, transistor 41 in a nonconducting condition, the second multiplier input signal from the output of amplifier 22 is prevented from reaching the output of the multiplier and consequently is prevented from being fed-back to the amplifier input.

To assure an output from multiplier 27 which is proportional to the product of the two input signals the first input signal is modulated so that transistor 40 is rendered nonconducting, and hence transistor 41 conducting, for a time during the modulation cycle which is linearly proportional to the first input signal to the multiplier. Thus, transistor 41 acts as a switch which is turned on and off by transistor 40 operative to apply the second multiplier input to the multiplier output.

The modulating voltage, which for example may be of triangular or sawtooth wave shape, is applied through resistance 60 to the base 42 of transistor 40. The value of resistance 60 is selected such that transistor 40 is switched off and on by the modulating voltage when the effective voltage at base electrode 42 passes through zero. This operation is shown in FIG. 6 for a modulating time base signal of triangular wave shape.

Potentiometer 62 has its movable tap 63 connected, in series with a resistance 64, to base electrode 42 and provides a zero adjustment for the multiplier. For example, when the first input signal to be multiplied has zero magnitude, movable tap 63 is adjusted to a value such that the time base modulating signal cannot quite render transistor 40 nonconducting. The magnitude of the first input signal to be multiplied applied to the base electrode 42 may be adjusted to some predetermined value so that, once rendered nonconducting, transistor 40 remains nonconducting as long as the first input signal to be multiplied is equal to, or greater than, that predetermined value. As the magnitude of the first input signal to be multiplied is varied between zero and the predetermined value, transistor 40 is rendered alternately non-conducting and conducting and remains nonconducting for a time proportional to the first input signal.

When transistor 40 is rendered nonconducting its collector voltage increases with respect to the common, or ground, causing transistor 41 to be rendered conductive. When the magnitude of the first input signal is sufficient to maintain transistor 40 in a non-conducting condition the output of the multiplier is equal to the value of the second input signal. For example, in a particular dual-range motor control system the multiplier output may normally be adjusted to provide an output equal to the second input signal (output of amplifier 22) when the first input signal has a magnitude of 10 volts. In such case the normal output of the multiplier is equal to $0.1xy$ (where $x$ designates the first and $y$ the second input signal to the multiplier).

The input applied to base electrode 42 of transistor 40 for various values of the first input signal to be multiplied (designated as "$x$") is shown in FIG. 6b with the corresponding multiplier output shown in FIG. 6c. The second input signal to be multiplied is designated in FIG. 6c as the "$y$" input so that it is readily apparent that the multiplier output is a rectangular pulse having an amplitude $y$ and a width proportional to $x$. The ouput, therefore, is proportional to the product of the first and second input signals ($kxy$).

The modulating time base signal may be of triangular wave shape developed, as shown in FIG. 4, by a square wave generator, including transformer 70 and opposite conducting-type transistors 71 and 72, which alternately charges a capacitance 74 first positive and then negative with respect to the point of reference potential, such as ground.

As shown, the primary winding 75 of transformer 70 is connected to a suitable source of alternating current voltage, shown schematically as generator 76. One side of the transformer secondary winding 77 is connected through a series resistance 78 to base electrodes 79 and 80 of transistors 71 and 72 respectively. The respective emitter electrodes 82 and 83 are connected together. Collector electrode 84 of transistor 71 is connected through resistance 85 to a point of positive potential. Collector electrode 88 of transistor 72 is connected through resistance 89 to a point of negative potential. Capacitance 74 is connected from the common junction between emitter electrodes 82 and 83 and the point of reference potential (ground). Capacitance 72 is thus, alternately charged positive and negative with respect thereto. The values of capacitance 74 and resistances 85 and 89 are selected so that the voltage across capacitance 74 is triangular. The triangular time base signal so developed may then be applied, as described hereinbefore, through resistance 60 to the base 42 of transistor 40.

On motor field applications, it is desirable to compensate for motor field saturation and armature reaction. This may be readily provided in the system of this invention since the parameters of the static electrical multiplier circuit 27 may be controlled. The typical inverse function curve shown in FIG. 2 can then be modified in a controlled manner to produce the desired effect.

For motor field saturation compensation, it is necessary to increase the initial rate at which the field weakens, as shown in FIG. 2, while the lower portion of the curve must change at a slower rate as the input to the inverse function generator (speed reference signal) is increased, to compensate for armature reaction.

To compensate for armature reaction effects, therefore, a portion of the speed reference signal from potentiometer 6 may be applied directly to the input of amplifier 22. Conveniently, this may be provided by means of a potentiometer 90 shown connected from the anode of rectifier device 15 to the point of reference potential. The desired portion of the speed reference signal is determined by the position of movable tap 92 and is applied through resistance 93 to the input of amplifier 22.

Compensation for motor field saturation effects may be conveniently provided by adjustment of variable resistance 53 to increase the magnitude of the speed reference signal applied to the base electrode 42 of transistor 40.

FIG. 7 shows a modification of the multiplier circuit illustrated in the system of FIG. 5 wherein only one switch means, such as transistor 140, is required. In this embodiment transistor 140, having base electrode 142, collector electrode 143 and emitter electrode 144, is biased for normal operation in its nonconducting or open operating condition. The first input signal, the reference signal from potentiometer 6 through crossover network 9, is applied to base electrode 142 and tends to render transistor 140 conductive. The second input signal, from the output of operational amplifier 22 is applied to the collector electrode 143. The time base signal is applied through resistance 60 and is zero-adjusted by the setting of movable tap 63 of potentiometer 62 so that, in the absence of the reference signal at terminal 31, the time base signal is just insufficient to render transistor 140 conducting. Thus, the second input signal is prevented from reaching the output.

The combination of the zero-adjusted time base signal and the first input signal at the base electrode 142 of transistor 140 is operative to render transistor 140 conductive for a time during the time base cycle which is linearly proportional to the magnitude of the first input signal, as shown in FIG. 6. Thus, the second input signal appears at the output for a time determined by how long transistor 140 was conductive. This time is determined, as shown, by the magnitude of the first input signal so that the output at terminal 32 is proportional to the product of the two input signals. The combination of rectifier device 56, inductance 51, resistance 52, and capacitance 58 again provides the averaging circuit for smoothing out the direct current output which is applied as a feed-back signal to the input of operational amplifier 22.

While the invention has been described with respect to certain specific dual-range motor control system embodiments, many changes and modifications will occur to those skilled in the art. It, therefore, is to be understood that the appended claims are intended to cover all such changes and modifications as fall within the true spirit and scope of the invention.

What I claim as new and desire to secure by Letters Patent of the United States is:

1. A circuit means for developing an output signal inversely related to a selected reference input signal comprising: an operational amplifier having a feed-back loop, and a static multiplier circuit in said feed-back loop, said multiplier circuit including first and second switch means each having an effective open and closed operating condition, circuit means arranging said switch means for opposite operating conditions with the operating condition of said first switch means determining the opposite operating condition for said second switch means, means providing normal operation for said first switch means in its closed and said second switch means in its open operating condition, means for applying the selected reference input signal to the first switch means, means for applying the output of the operational amplifier to said second switch means, and means for modulating the reference signal applied to said first switch means so that the operating condition thereof is changed for a time during the modulation cycle which is linearly proportional to the magnitude of said reference signal.

2. A multiplier circuit comprising: first and second switch means each having an effective open and closed operating condition; means arranging said first and second switch means in opposite operating conditions with the operating condition of said first switch means controlling the operating condition of said second switch means; means for applying a first electrical signal to be multiplied to said first switch means tending to change the operating condition thereof; means for applying a second electrical signal to be multiplied to said second switch means; and means for applying a time base signal to said first switch means operative to change the operating condition of said first switch means for a time during the cycle of said time base signal which is linearly proportional to said first electrical signal.

3. The multiplier circuit of claim 2 wherein said first and second switch means are transistor devices.

4. A multiplier circuit comprising: first and second switch means each having an effective open and closed operating condition; circuit means arranging said switch means for opposite operating conditions with the operating condition of said first switch means determining the opposite operating condition for said second switch means; circuit means providing normal operation for said first switch means in its closed and said second switch means in its open operating condition; means for applying a first electrical quantity to be multiplied to said first switch means tending to change the operating condition thereof; means for applying a second electrical quantity to be multiplied to said second switch means; and means for modulating said first electrical quantity so that the operating condition of said first switch means is changed for a time during the modulation cycle which is linearly proportional to the magnitude of said first electrical quantity.

5. The multiplier circuit of claim 4 wherein said first and second switch means are transistors.

6. A multiplier circuit comprising: first and second transistor devices each exhibiting a conducting and a nonconducting operative condition and having emitter, base and collector electrodes; circuit means for biasing said first transistor in a conducting condition; circuit means coupling the collector electrode of said first transistor to the base electrode of said second transistor for applying the collector electrode voltage of said first transistor to the base electrode of said second transistor whereby the operating condition of said first transistor determines the operating condition of said second transistor; means for applying a first electrical signal to the base electrode of said first transistor operatively tending to render said transistor nonconducting; means for applying a second electrical signal to the collector electrode of said second transistor; and means for applying a modulating time base signal to the base electrode of said first transistor, the amplitude of said time base signal being just insufficient to change the operating condition of said first transistor whereby the operating condition of said first transistor is changed for a time during the modulation cycle which is linearly proportional to the first electrical input signal producing an output at the emitter electrode of said second transistor which is proportional to the product of said first and second electrical signals.

7. An inverse function generator comprising: an operational amplifier having input and output means; means for applying an electrical signal to said amplifier input means; and a static multiplier circuit, said multiplier circuit including,
(a) first and second transistor devices each exhibiting a conducting and a nonconducting operating condition and having base, emitter and collector electrodes,
(b) circuit means for biasing said first transistor device in a conducting condition,
(c) circuit means for coupling the collector electrode of said first transistor to the base electrode of said second transistor operative to apply the collector voltage of said first transistor to the base electrode of said second transistor whereby the opposite operating condition of said second transistor is determined by the operating condition of said first transistor,
(d) means for applying a first electrical signal to the base electrode of said first transistor of a polarity tending to render said first transistor nonconducting,
(e) means coupling the output of said operational amplifier to the collector electrode of said second transistor and,
(f) means for applying a zero-adjusted time base signal to the base electrode of said first transistor operative to render said first transistor alternately nonconducting and conducting when the effective voltage of said base electrode passes through zero whereby the operating condition of said first transistor is changed for a time during the time base cycle which is linearly proportional to the magnitude of said first electrical signal;
and means for applying the output appearing at said second transistor to the input of said operational amplifier as a feed-back signal so that the output of said operational amplifier is inversely related to the magnitude of said first electrical signal.

References Cited by the Examiner
UNITED STATES PATENTS

| | | | |
|---|---|---|---|
| 2,950,399 | 8/60 | Schmid | 307—88.5 |
| 3,026,464 | 3/62 | Greening et al. | 318—338 X |
| 3,041,514 | 6/62 | Hansen | 318—154 |
| 3,089,968 | 5/63 | Dunn | 307—88.5 |
| 3,096,487 | 7/63 | Lee | 307—88.5 |

ARTHUR GAUSS, *Primary Examiner.*

ORIS L. RADER, *Examiner.*